US006298942B1

United States Patent
Schlatmann et al.

(10) Patent No.: US 6,298,942 B1
(45) Date of Patent: Oct. 9, 2001

(54) HOUSING HAVING A LOUDSPEAKER SYSTEM

(75) Inventors: Paul H. M. Schlatmann, Eindhoven (NL); Michel J. H. Tiessens, Leuven (BE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/493,959

(22) Filed: Jan. 28, 2000

(30) Foreign Application Priority Data

Apr. 28, 1999 (EP) .................................................. 99201328

(51) Int. Cl.$^7$ ...................................................... H05K 5/00

(52) U.S. Cl. .......................... 181/144; 181/199; 181/141

(58) Field of Search ...................................... 181/144, 145, 181/147, 148, 150, 141, 199; 381/335, 182, 184, 186

(56) References Cited

U.S. PATENT DOCUMENTS

| 4,998,283 | * | 3/1991 | Nishida et al. | 381/190 |
| 5,307,418 | * | 4/1994 | Sumitani | 181/147 |
| 5,553,149 | * | 9/1996 | Freadman | 181/147 |
| 5,898,137 | * | 4/1999 | Saito | 181/144 |

FOREIGN PATENT DOCUMENTS 3835539   4/1990   (DE) .

* cited by examiner

Primary Examiner—Khanh Dang

(57) ABSTRACT

A housing having a loudspeaker system including two elongate mutually identical loudspeaker enclosures (9a, 9b) situated near a front side (3a) of the housing and extending parallel to one another, each loudspeaker enclosure comprising a first loudspeaker unit (19a, 19b) for radiating tones of comparatively high frequencies and a second loudspeaker unit (29a, 29b) for radiating tones of comparatively low frequencies. The first loudspeaker units are both situated at the same level (11), while one of the two loudspeaker units is situated at one side and the other one is situated at the other side of this level.

15 Claims, 2 Drawing Sheets

HOUSING HAVING A LOUDSPEAKER SYSTEM

BACKGROUND OF THE INVENTION

The invention relates to a housing having a loudspeaker system which includes two elongate loudspeaker enclosures which are situated near a front side of the housing and which extend at a distance from one another, which enclosures each have a longitudinal axis, the two longitudinal axes extending at least substantially parallel to one another and to the front side, each loudspeaker enclosure comprising near its longitudinal axis a first loudspeaker unit for radiating tones which are at least substantially related to a first frequency range, and a second loudspeaker unit for radiating tones which are at least substantially related to a second frequency range lower than the first frequency range, the first loudspeaker units both being situated on one and the same imaginary connecting line which extends transversely to the longitudinal axes of the loudspeaker enclosures, and both second loudspeaker units being situated at a substantially equal distance from this connecting line.

Such a housing is known from DE-A 38 35 539. The known housing forms part of a television set having a vertically disposed loudspeaker enclosure secured to the housing at opposite sides of a display screen. The two respective loudspeaker enclosures have been given a mirror-symmetrical design for acoustic and esthetic reasons. Each loudspeaker enclosure has an active loudspeaker for radiating lower mid-range tones in its central part and this loudspeaker further has two openings in its upper part and its lower part. These openings can be used both for mounting tweeters and as bass-reflex openings. The function of the openings depends on whether the enclosure is a right-hand or a left-hand enclosure and during assembly care is taken that tweeters are mounted in the upper openings of each associated pair of loudspeaker enclosures; the lower openings of such a pair of enclosures serving as bass-reflex openings.

A drawback of the known housing is that two mutually different loudspeaker enclosures are used, which is impractical, leads to additional manufacturing and assembly costs, and increases the risk of an incorrect assembly.

OBJECTS AND SUMMARY OF THE INVENTION

It is an object of the invention to improve the housing of the type defined in the opening paragraph, in such a manner that a practical and low-cost realization of the loudspeaker system is possible while the acoustic performance of the loudspeaker system is maintained.

In order to achieve said object the housing in accordance with the invention is characterized in that one of the two loudspeaker units is situated in an area which extends at one side of the connecting line which extends transversely to the longitudinal axes of the loudspeaker enclosures, and the other one of the second loudspeaker units is situated in an opposite area which extends at the other side of said connecting line.

The invention is based on the recognition of the fact that the human ear is directionally insensitive to bass tones. Loudspeaker units which emit only or mainly bass tones may therefore be arranged at various locations without causing any audible acoustic effects. The invention utilizes this fact with the advantage that the two loudspeaker enclosures which are used can be identical to one another. As is common practice, the front sides of the loudspeaker enclosures may be covered with a grille, a fabric covering or the like, inter alia for esthetic reasons. A further advantage of the housing in accordance with the invention is that the possibility of using two mutually identical loudspeaker enclosures provides more scope for the construction and styling of the housing.

As is also apparent from the foregoing, the housing is preferably equipped with two basically identical loudspeaker enclosures. The styling and/or the construction of the loudspeaker enclosures and of the parts of the housing which cooperate therewith is preferably such that during mounting of the loudspeaker enclosures in or on the housing these enclosures can be secured at the appropriate locations in only one position and orientation. A loudspeaker system having two identical loudspeaker enclosures has considerable advantages in production. Only loudspeaker enclosures of one type have to be manufactured, which is a cost-reducing factor. Moreover, there are logistic and administrative advantages.

An embodiment of the housing in accordance with the invention is characterized in that the loudspeaker enclosures each extend at least substantially vertically with their longitudinal axes. This is an arrangement which is known per se. With this arrangement the two loudspeaker units are disposed at the same level, while the second loudspeaker units are each situated at a different level, i.e. one second loudspeaker unit at a higher level and the other second loudspeaker unit at a lower level with respect to the first-mentioned level. Furthermore, in this embodiment the loudspeaker enclosures are preferably situated each near one side of the housing. The space between the loudspeaker enclosures can be used for accommodating audio, video and/or data equipment.

An embodiment of the housing in accordance with is characterized in that the first loudspeaker units each comprise an active loudspeaker, which is also referred to as a woofer. Such a loudspeaker unit has an operating range which extends roughly between 40 Hz and 3000 Hz.

An embodiment of the housing in accordance with the invention is characterized in that the first loudspeaker units each comprise a tweeter. Such a loudspeaker unit has an operating range which extends roughly between 3 kHz and 20 kHz. In many versions the first loudspeaker units will comprise both an active loudspeaker and a tweeter and will consequently have an operating range which extends roughly between 40 Hz and 20,000 Hz.

An embodiment of the invention is characterized in that the second loudspeaker units each comprise a passive radiator. Such a loudspeaker unit has an operating range which extends roughly between 40 Hz and 150 Hz. For a correct performance of the passive radiators the loudspeaker enclosures in the present embodiment are wholly closed. Alternatively, the second loudspeaker units may have bass-reflex openings.

The invention further relates to an apparatus including a display screen and a housing with a loudspeaker system.

Such an apparatus is known from the afore-mentioned DE-A 38 35 539. The known apparatus is a conventional television set, which has a loudspeaker enclosure secured to the housing of the television set at opposite sides for the purpose of stereophonic reproduction of sound. These loudspeaker enclosures are constructed in a manner as already stated in the introductory part of this description.

It is an object of the invention to improve the known apparatus by utilizing the advantages which can be attained by means of the housing in accordance with the invention.

To achieve this object, in accordance with the invention, the apparatus including a display screen includes the housing in accordance with the invention, the display screen extending between the two loudspeaker enclosures and the connecting line which extends transversely to the longitudinal axes of the loudspeaker enclosures extending through a central area of the display screen. The central area is to be understood to mean a zone which extends through or in the proximity of the middle or center of the display screen. In general, the loudspeaker enclosures are disposed vertically and are situated at opposite sides of the display screen. During use, but this depends on the construction of the loudspeaker enclosures, tones in the entire audible frequency range can be radiated. Anyway, it is guaranteed that in the apparatus in accordance with the invention tones to which the human ear is directionally sensitive are radiated from the same level, particularly the level related to the center of the screen, while the other tones, i.e. the bass tones, to which the ear is not directionally sensitive, are emitted from two different levels. This yields a constructionally simple and cheap loudspeaker system but an acoustically high-grade apparatus.

An embodiment of the housing in accordance with the invention is characterized as defined in Claim 8. In this embodiment the first loudspeaker unit of the further loudspeaker enclosure functions as a so-called center loudspeaker, while the other two loudspeaker enclosures serve for the stereophonic reproduction. In a practical embodiment of the housing the further loudspeaker enclosure is preferably disposed near an edge of the housing which extends between the two sides of the housing.

The apparatus in accordance with the invention is very suitable for the use of a flat-panel display screen because the loudspeaker enclosures that are used are particularly suitable for construction as comparatively flat enclosures. Such an apparatus can be a television set as well as a monitor.

The invention further relates to a loudspeaker enclosure which is suitable or constructed and apparently intended for use with the housing in accordance with the invention. The loudspeaker enclosure in accordance with the invention has one or more of the characteristic features as defined in Claim 12, 13 or 14.

Various combinations of the embodiments of the invention are possible.

BRIEF DESCRIPTION OF THE DRAWINGS

The invention will be described in more detail, by way of example, with reference to the drawings, in which.

DESCRIPTION OF THE PREFERRED EMBODIMENTS

Figure 1:
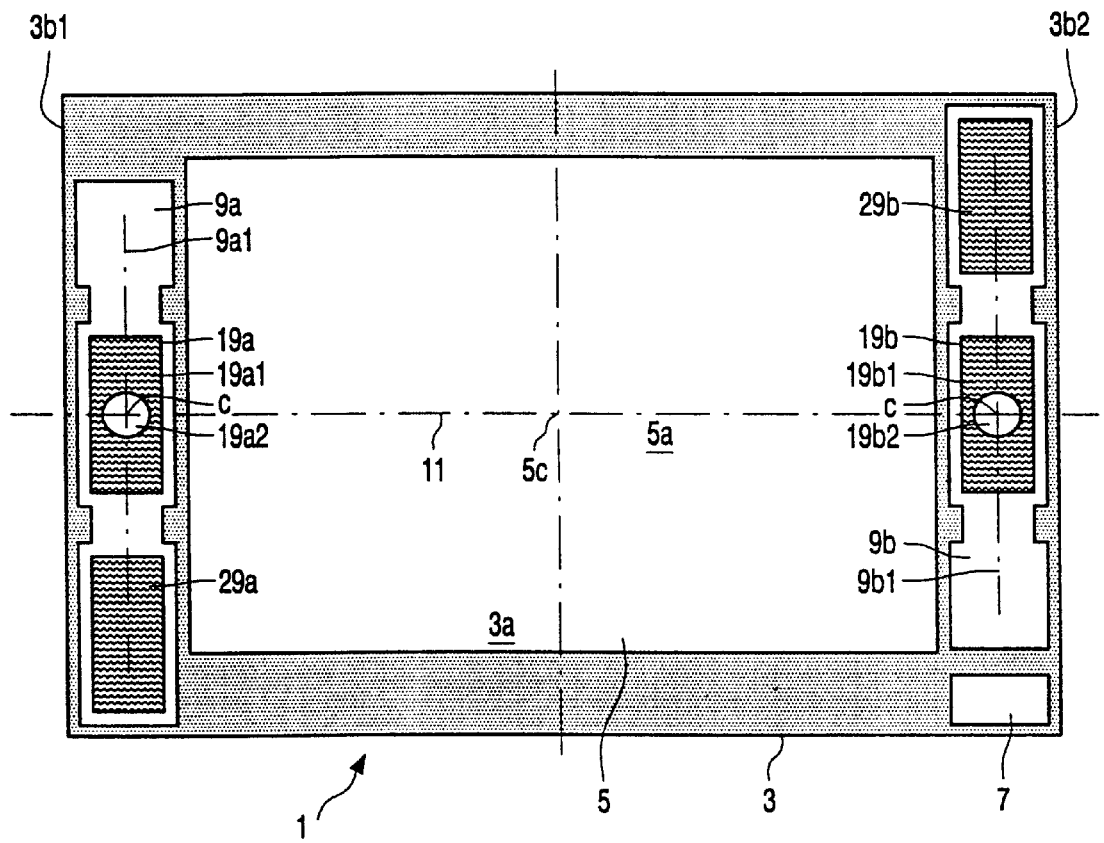
FIG. 1 is a diagrammatic front view of an embodiment of the apparatus in accordance with the invention including a display screen.

The apparatus 1 shown in FIG. 1 is a flat-panel multimedia TV set suitable for wall-mounting. The apparatus 1 has a housing 3 which accommodates a display screen 5 and a loudspeaker system. The housing 3 has a front side 3*a*, in which an on/off switching unit 7 extends and which is bounded by two lateral edges 3*b*1 and 3*b*2 of the housing 3.

The loudspeaker system comprises two elongate identical, or at least substantially identical, loudspeaker enclosures or boxes 9*a*, 9*b* whose longitudinal axes 9*a*1 and 9*b*1 extend parallel to one another and parallel to the front side 3*a*. The loudspeaker enclosures 9*a* is situated near the lateral edge 3*b*1 of the housing 3 and the loudspeaker enclosures 9*b* is situated near the lateral edge 3*b*2. Each of the loudspeaker enclosures 9*a* and 9*b* comprises, viewed along its longitudinal axis, a first loudspeaker unit 19*a* or 19*b* for radiating mid-range and treble tones and a second loudspeaker unit 29*a* or 29*b* for radiating bass tones. In the present example the first loudspeaker unit 19*a* or 19*b* of each loudspeaker enclosure comprises an active loudspeaker (woofer) 19*a*1 or 19*b*1, respectively, and a tweeter 19*a*2 or 19*b*2, respectively, the central axes c of the woofer and the tweeter of each of the loudspeaker units 19*a* and 19*b* being coincident and being oriented transversely to the longitudinal axis of the respective loudspeaker enclosures. In the present example the second loudspeaker units 29*a* and 29*b* are each formed by a passive radiator. The loudspeaker enclosures 9 and 9*b* are positioned with respect to the housing 3 and, consequently, with respect to the display screen 5 in such a manner that the first loudspeaker units 19*a* and 19*b* are both situated on the same —imaginary —connecting line 11 which is oriented transversely to the longitudinal axes 9*a*1 and 9*b*1, the connecting line 11 extending through a central area 5*a* of the display screen 5. The central area 5*a* is to be understood to mean an area or zone in the proximity, particularly the direct proximity, of the center 5*c* of the display screen 5, which center 5*c* may lie in the area. In the present embodiment the central axes c intersect the connecting line 11. Furthermore, the orientation of the loudspeaker enclosures 9*a* and 9*b* is such that the first loudspeaker unit 29*a* is situated at one side of the connecting line 11 and the second loudspeaker unit 29*b* is situated at the other side of this line.

Figure 2:
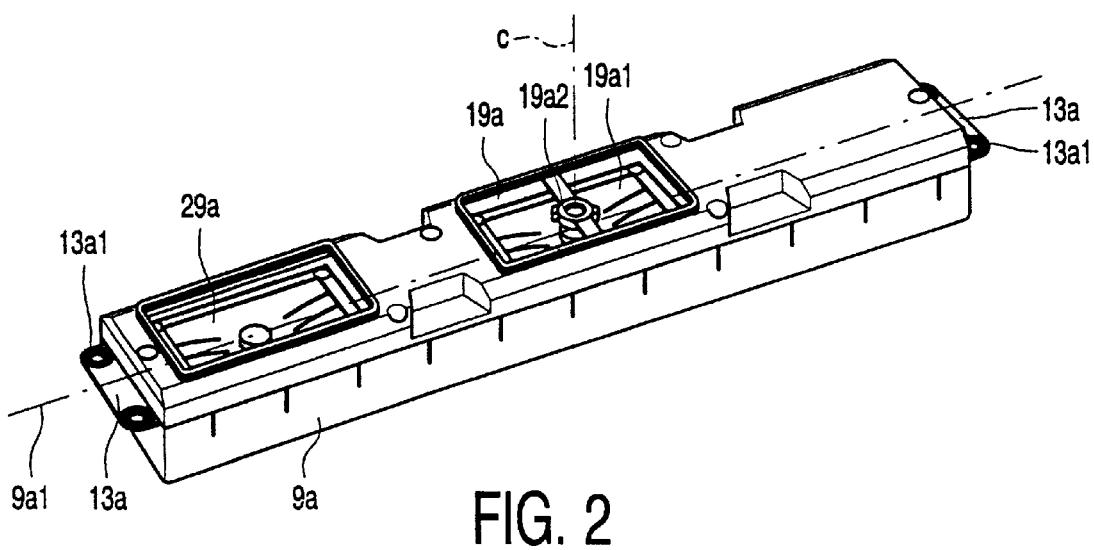
FIG. 2 is a perspective view of an embodiment of the apparatus in accordance with the invention including a display screen.

The loudspeaker enclosure shown in FIG. 2 corresponds to the loudspeaker enclosures 9*a* and 9*b* used in the apparatus 1 shown in FIG. 1 and is referenced 9*a*. The loudspeaker enclosures is fully closed and has a longitudinal axis 9*a*1 and a first loudspeaker unit 19*a*, situated on the longitudinal axis 9*a*1, for radiating tones related to a first frequency range, and a second loudspeaker unit 29*a*, situated on the same longitudinal axis 9*a*1, for radiating tones related to a second frequency range which is lower than the first frequency range.

In this embodiment the first loudspeaker unit 19*a* comprises a woofer 19*a*1 and a tweeter 91*a*2, the tweeter and the woofer having a common central axis c oriented transversely to the longitudinal axis 9*a*1. The loudspeaker enclosure 9*a* has fixing means for securing it to a housing, such as the housing 3 of the apparatus as shown in FIG. 1. In the present example the fixing means comprise two mounting flanges 13*a* each having two mounting lugs 13*a*1.

Figure 3:
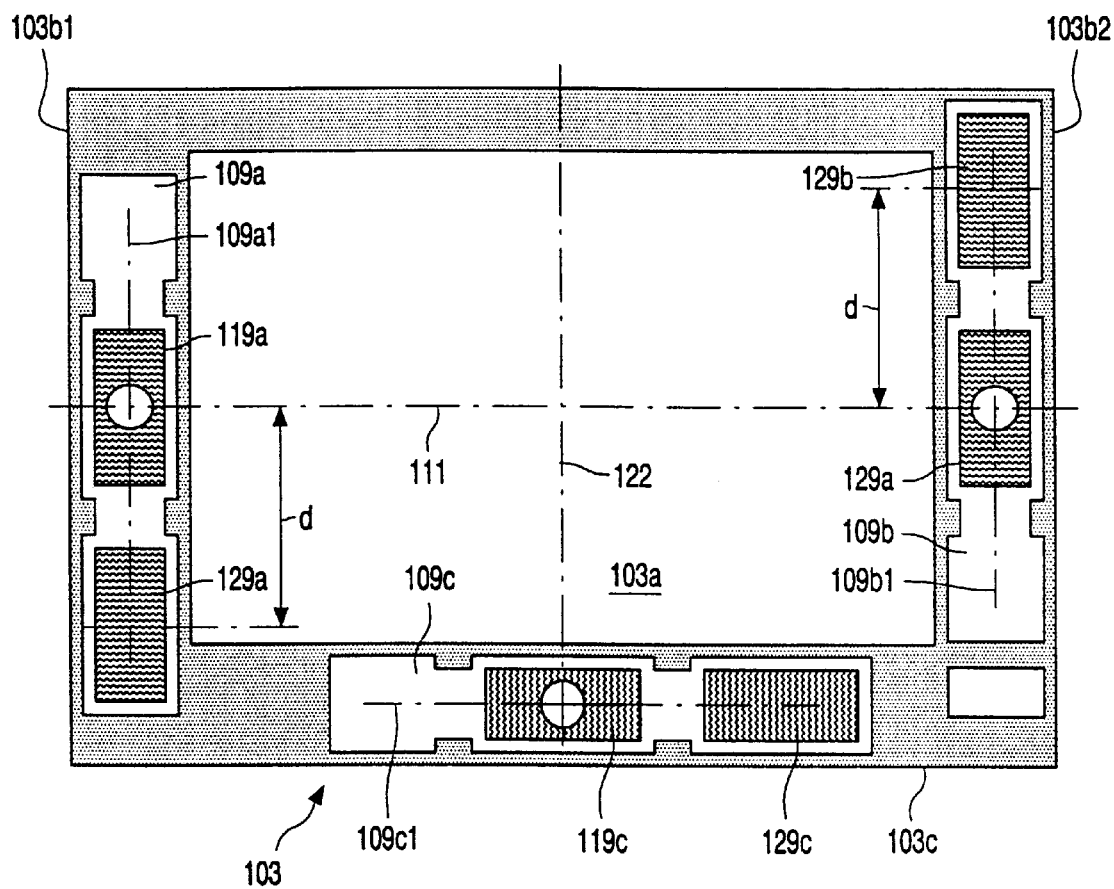
FIG. 3 is a diagrammatic front view of an embodiment of the housing in accordance with the invention.

The housing 103 shown in FIG. 3 has been provided with three identical, or at least substantially identical, elongate loudspeaker enclosures 109*a*, 109*b* and 109*c*, which all extend near a front side 103*a* of the housing 103. Two of these loudspeaker enclosures, i.e. the loudspeaker enclosures 109*a* and 109*b*, extend at a distance from one another and each have a longitudinal axis, 109*a*1 and 109*b*1 respectively, which longitudinal axes extend at least substantially parallel to one another and to the front side 103*a*. Each of the loudspeaker enclosures 109*a* and 109*b* has, near its respective longitudinal axis 109*a*1 or 109*b*1, a first loudspeaker unit, 119*a* or 119*b* respectively, for radiating tones which are at least substantially related to a first frequency range, and has, near the same longitudinal axis, a second loudspeaker unit, 129a or 129b respectively, for radiating tones which are at least substantially related to a second frequency range below the first frequency range. The first loudspeaker units 119a and 119b are both situated on the same connecting line 111 which extends transversely to the longitudinal axes 109a1 and 109b1 of the loudspeaker enclosures, the two second loudspeaker units 129a and 129b being situated at an equal distance d from this connecting line. One of the second loudspeaker units 129a is situated in an area at one side of the connecting line 111 which extends transversely to the longitudinal axes 109a1 and 109b1, and the other one of the second loudspeaker units 129b or 129a is situated in an area which extends at an opposite side of said connecting line 111.

A further loudspeaker enclosure, namely the loudspeaker enclosure 109c has a longitudinal axis 109c1, which extends at least substantially perpendicularly to the longitudinal axes 109a1 and 109b1 of the above-mentioned two loudspeaker enclosures 109a and 109b. The loudspeaker enclosure 109c has a first loudspeaker unit 119c situated on a further line 122 which extends transversely to the connecting line 111, the first loudspeaker unit 119c being situated at an least substantially equal distance from said two loudspeaker enclosures 109a and 109b. In the present example the connecting line 111 and the further line 122 intersect one another in or in the proximity of the imaginary center of the front side 103a. In this example the loudspeaker enclosure 109c is situated near a horizontal edge 103c which extends between two vertical lateral edges 103b1 and 103b2 of the housing 103. The first loudspeaker units 119a, 119b and 119c and the second loudspeaker units 129a, 129b and 129c can be of constructions similar to those of the corresponding loudspeaker units used in the loudspeaker enclosure shown in FIG. 2. All the loudspeaker enclosures 109a, 119b and 109c may even be identical to the loudspeaker enclosure as shown in FIG. 2.

It is to be noted that the invention is not limited the embodiments disclosed herein. For example, the apparatus in accordance with the invention may be constructed as a monitor instead of as a TV set. The display need not necessarily be a flat-panel display screen. Furthermore, the first loudspeaker unit may comprise only a woofer or a tweeter. Moreover, the second loudspeaker unit may have a bass-reflex opening instead of a passive radiator.

What is claimed is:

1. A housing and loudspeaker system apparatus comprising:
   a housing having a front side;
   a first elongate loudspeaker enclosure situated near the front side of the housing and having a first longitudinal axis substantially parallel to the front side of the housing, the first elongate loudspeaker enclosure comprising, near the first longitudinal axis, a first higher range loudspeaker unit capable of radiating tones substantially related to a first frequency range and a first lower range loudspeaker unit capable of radiating tones substantially related to a second frequency range lower in frequency than the first frequency range; and
   a second elongate loudspeaker enclosure situated near the front side of the housing and having a second longitudinal axis substantially parallel to the first longitudinal axis, the second elongate loudspeaker enclosure comprising, near the second longitudinal axis, a second higher range loudspeaker unit capable of radiating tones substantially related to the first frequency range and a second lower range loudspeaker unit capable of radiating tones substantially related to the second frequency range,
   the first and second higher range loudspeaker units both being situated on a first imaginary connecting line that extends transversely to the first and second longitudinal axes, and
   the first and second lower range loudspeaker units being situated at a substantially equal distance from, but on opposite sides of, said connecting line.

2. The apparatus of claim 1, wherein the first and second loudspeaker enclosures are basically identical to one another.

3. The apparatus of claim 1, wherein the first and second loudspeaker enclosures each extend at least substantially vertically with their longitudinal axes.

4. The apparatus of claim 1, wherein the first and second loudspeaker enclosures are situated near first and second lateral edges of the housing, respectively.

5. The apparatus of claim 1, wherein the first and second higher range loudspeaker units each comprise an active loudspeaker.

6. The apparatus of claim 1, wherein the first and second higher range loudspeaker units each comprise a tweeter.

7. The apparatus of claim 1, wherein the first and second lower range loudspeaker units each comprise a passive radiator.

8. The apparatus of claim 1, further including a display screen extending between the first and second loudspeaker enclosures such that the first imaginary connecting line extends through a central area of the display screen.

9. The apparatus of claim 8, wherein the display screen takes the form of a flat panel.

10. The apparatus of claim 1, wherein at least the first higher range loudspeaker unit includes an active loudspeaker and a tweeter, the tweeter having a central axis oriented transversely to the first longitudinal axis and coinciding at least substantially with the central axis of the active loudspeaker.

11. The apparatus of claim 1, wherein a least the first lower range loudspeaker unit is fully closed and comprises a passive radiator.

12. The apparatus of claim 1, further comprising a third elongate loudspeaker enclosure situated near the front side of the housing and having a third longitudinal axis substantially parallel to the front side of the housing and extending substantially transversely to the first and second longitudinal axes,
   the third elongate loudspeaker enclosure comprising, near the third longitudinal axis, a third higher range loudspeaker unit capable of radiating tones substantially related to the first frequency range and a third lower range loudspeaker unit capable of radiating tones substantially related to the second frequency range,
   the third higher range loudspeaker unit being situated on a second imaginary connecting line that extends transversely to the first imaginary connecting line, and
   the third higher range loudspeaker unit being situated a substantially equal distance from the first elongate loudspeaker enclosure as from the second elongate loudspeaker enclosure.

13. The apparatus of claim 12, wherein the first and second loudspeaker enclosures are situated near first and second lateral edges of the housing, respectively, and the third loudspeaker enclosure is situated near a housing edge that extends between the two lateral edges of the housing.

14. The apparatus of claim 12, wherein at least the third higher range loudspeaker unit includes an active loudspeaker and a tweeter, the tweeter having a central axis oriented transversely to the third longitudinal axis and coinciding at least substantially with the central axis of the active loudspeaker.

15. The apparatus of claim 12, wherein at least the third lower range loudspeaker unit is fully closed and comprises a passive radiator.

* * * * *